Nov. 26, 1929.　　O. MORGAN ET AL　　1,736,933
OIL DISTRIBUTING SYSTEM
Filed March 6, 1928　　3 Sheets-Sheet 3
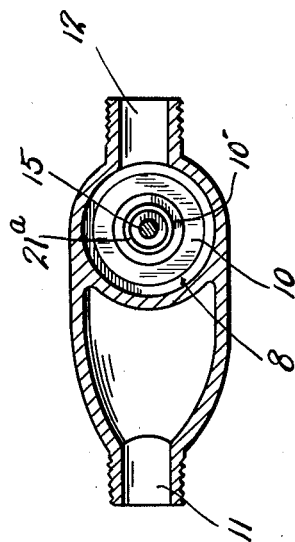
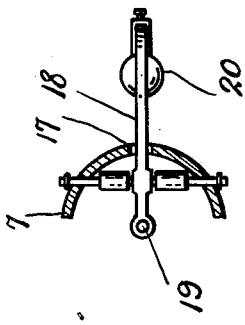
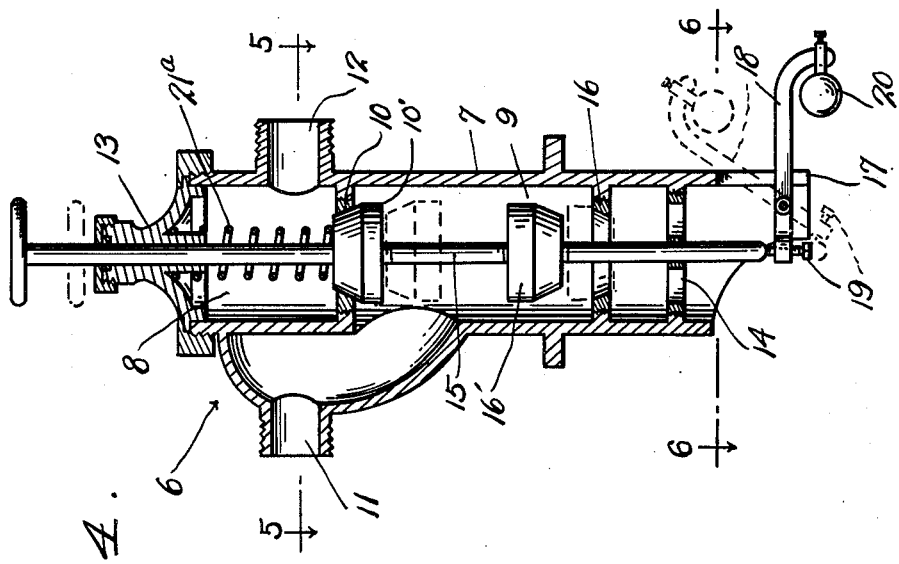
Inventors
Oliver Morgan &
J. W. Stark
By Clarence A. O'Brien
Attorney Patented Nov. 26, 1929

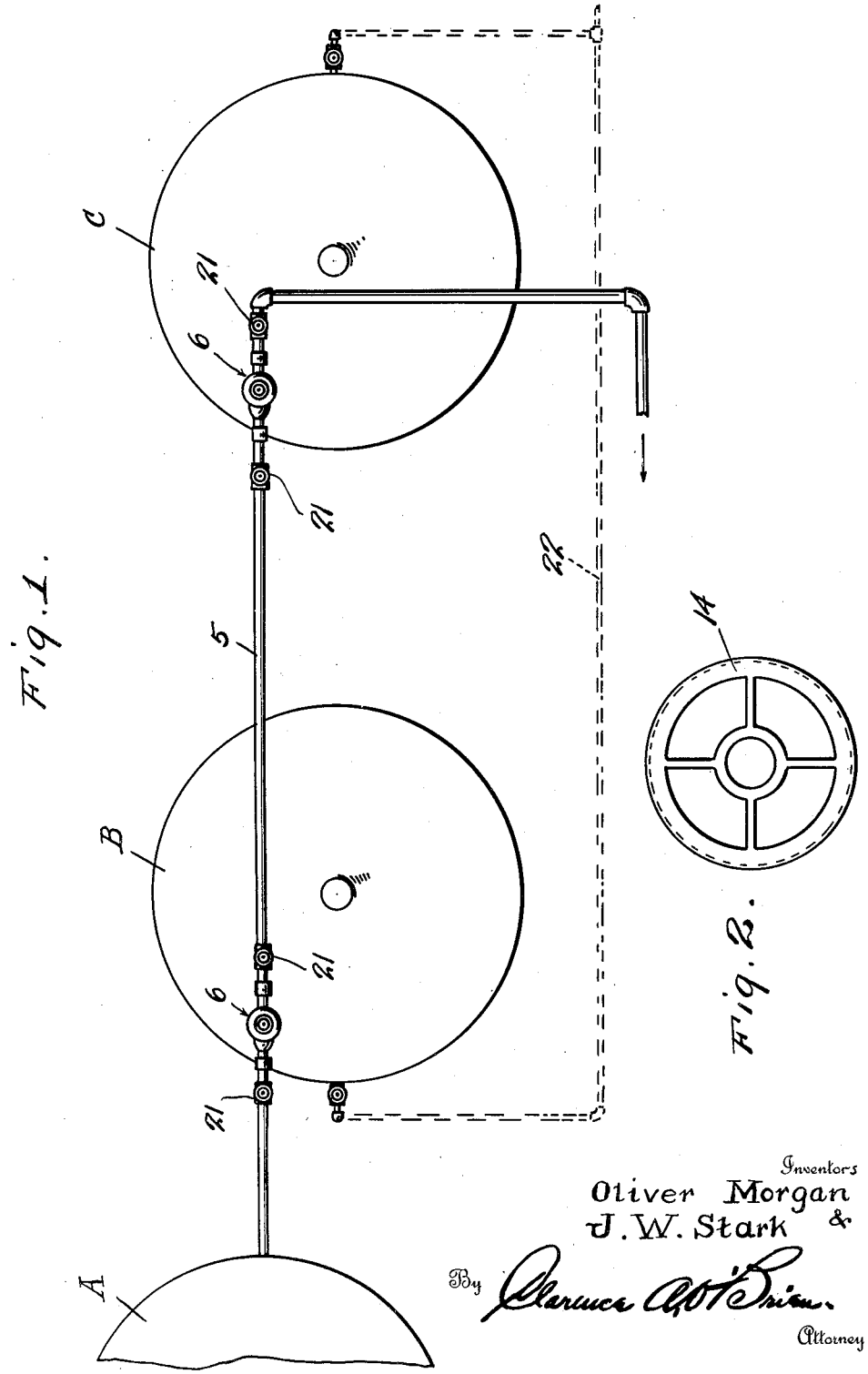

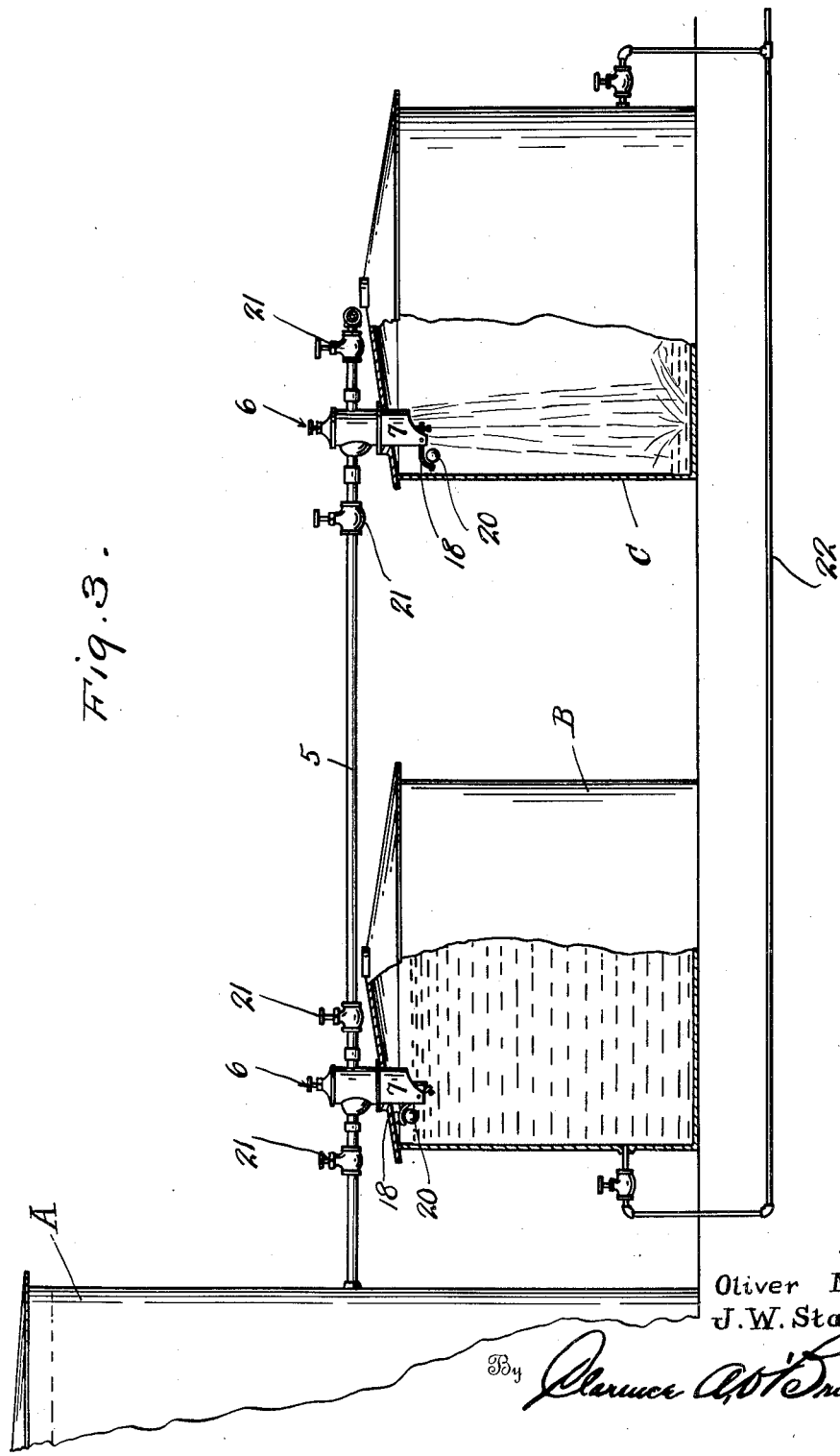

1,736,933

UNITED STATES PATENT OFFICE

OLIVER MORGAN AND JOHN W. STARK, OF WEWOKA, OKLAHOMA

OIL-DISTRIBUTING SYSTEM

Application filed March 6, 1928. Serial No. 259,514.

This invention relates to new and useful improvements in oil distributing systems and aims to provide a system whereby oil from the usual gas trap will be properly distributed amongst a large number of oil tanks arranged at various places in an oil field.

More specifically, the system aims to control the supply of the oil from the gas trap to the oil tanks so that all of the oil tanks will at once be filled to maintain a relatively constant level, the system including generally a gravity line leading to all of the oil tanks and having communication with the gas trap, a valve structure being arranged between each oil tank and the gravity line that is automatically operable to open position when the oil drops below a certain level and that is automatically closed when the oil reaches a predetermined level, the valve being so constructed that when the supply of the oil to a particular tank is closed, the gravity line will be opened to the next adjacent tank and so on throughout all of the tanks in the field.

A most important object of this invention is to provide a system of this character that is of unusually simple construction, but at the same time positive and automatic in its operation so as to maintain a predetermined level of the oil within all of the oil tanks which are supplied from the usual gas trap receiving its supply direct from the oil well.

With the foregoing and other objects in view as the nature of the invention will be better understood, the same comprises the novel form, combination and arrangement of parts hereinafter more fully described, shown in the accompanying drawings and claimed.

In the accompanying drawings wherein like reference characters indicate corresponding parts throughout the several views:

Figure 1 is a top plan view disclosing fragmentarily a conventional gas trap, and two storage tanks within a field, said tanks and gas trap being equipped with our improved system.

Figure 2 is a plan view of a valve stem guide spider.

Figure 3 is a side elevation partially in cross section of the gas trap and oil tanks, the present system being installed, the tank nearest the gas trap being filled and the flow of the oil therein cut off by reason of the improved valve while the next tank is illustrated as receiving its supply of oil from the gas trap.

Figure 4 is a detail longitudinal section of the valve structure per se.

Figure 5 is a horizontal section taken substantially upon the line 5—5 of Figure 4, and Figure 6 is a horizontal section taken substantially upon the line 6—6 of said Figure 4 and looking downwardly in the direction of the arrow.

Now having particular reference to the drawings, and especially to Figures 1 and 3, A designates a conventional gas trap within an oil field that receives its supply of oil direct from the well, while B and C designate two of the usually large number of storage oil tanks arranged throughout the field and receiving their supply of oil from said gas trap.

Our invention per se consists of a gravity oil supply line 5 having communication at one end with the gas trap A and having communication with all of the oil storage tanks within the field through the medium of a valve structure arranged within the deck of each tank, this valve structure being designated generally by the reference character 6.

Each valve 6 consists of a somewhat elongated cylindrical body 7 constructed to provide an upper and a lower chamber 8 and 9, these chambers communicating through a renewable valve seat ring 10. Having communication with the lower chamber 9 directly beneath the upper chamber is an inlet nipple 11, while communicating with the upper chamber 8 is an outlet nipple 12, these nipples being constructed in any suitable manner to permit the arrangement of the valve within the gravity line 5, see Figures 1 and 3.

The opposite ends of the body 7 are open while arranged within the upper open end is a suitable closure 13.

Longitudinally slidable through this closure 13 and through a removable spider 14 within the lower end of the body 7 is a valve stem 15 that is also movable through the center of a renewable valve seat ring 16 within the lower body chamber 9 and above said spider 14 as clearly disposed in Figure 4. Between the valve rings 10 and 16 the valve stem 15 is equipped with a pair of spaced valve plugs 10' and 16' constructed complemental to said valve seat rings.

The lower end of the body 7 is provided with a longitudinal slot 17 extending horizontally through which and pivoted adjacent its inner end within the body is a lever 18, the inner end of which terminating directly beneath the lower end of the valve stem 15 and being equipped with a regulating set screw 19. The outer end of this lever is formed with a goose neck upon which is adjustably arranged a suitable float member 20.

Surrounding the valve stem 15 between the uppermost valve plug 10' and the closure 13 is an expansible counterbalancing spring 21ª, the strength of which is slightly less than the weight of the outer end of the lever 18 and the float 20 so that when the outer end of the lever is in horizontal position the said stem 15 will be forced upwardly against the action of the spring 21ª so as to maintain the plug 10' within its seat cutting off the passage of the oil into the upper chamber 8, but permitting the oil to flow through the lowermost chamber 9 into the respective storage tanks of the valve unit, the lower end of the valve unit being suitably arranged in oil tight manner through the deck of the tank as disclosed in Figure 3. However, as soon as the oil in this tank reaches the float 20, the outer end of the lever will be swung upwardly, releasing the pressure against the valve stem 15 whereupon the stem will be forced downwardly by reason of the spring 21ª' for closing the passage to the lowermost chamber and opening the passage to the uppermost chamber so that the supply of oil to the particular tank will be cut off but opening the supply of oil through the gravity line to the next adjacent tank, the operation being completed throughout all of the tanks in the field.

The said gravity line 5 at opposite sides of each of the valve units 6 is equipped with cut off valves 21—21 to permit installation of the stem, the draining of any of the tanks and also the supply of oil into any predetermined tanks.

Communicating with all of the storage tanks in the system is the usual oil line 22 whereby the oil may be conveyed from any desired one or plurality of the storage tanks.

In view of the foregoing description when considered in conjunction with the accompanying drawings it will be apparent that through an oil distributing system of this character the various oil tanks within an oil field may be automatically filled as soon as the oil level therein drops below a predetermined degree so that a relatively constant level will be maintained at all times within the various tanks.

Even though we have herein shown and described our improved oil distributing system as consisting of certain detail structural features it is nevertheless to be understood that some changes may be made therein without affecting the spirit and scope of the appended claim.

Having thus described the invention, what we caim as new is:—

In an automatic valve of the class described, a cylindrical body having its lower end extending into a receptacle to be filled, the lower end of the cylindrical body being opened, said cylindrical body being divided into upper and lower chambers, the bottom of the upper chamber being provided with an inlet opening, the side of the upper chamber being provided with an outlet opening, the side of the lower chamber being provided with an inlet opening, the bottom of the lower chamber being provided with an outlet opening, a valve stem arranged for slidable movement centrally through said chambers, the upper and lower valves secured on said stem for cooperation with the inlet and outlet openings of the upper and lower chambers respectively, float operated means associated with the lower end of the cylindrical body and cooperating with the lower end of the valve stem for raising the same to unseat the lower valve and seat the upper valve during the filling of the receptacle, and additional means for moving the valve stem downwardly to close the outlet opening in the lower chamber and open the inlet opening in the upper chamber when a predetermined level is reached in the receptacle, said float control means including a lever pivotally supported at its inner end on the lower end portion of the cylindrical body and adapted for vertical swinging movement, a float carried by the outer end of the vertically swinging lever, the pivoted inner end of the lever terminating directly below the lower end of the valve stem for cooperation therewith, and a regulating set screw arranged vertically through the inner end of the pivoted lever for engagement with the lower end of the valve stem.

In testimony whereof we affix our signatures.

OLIVER MORGAN.
JOHN W. STARK.